March 3, 1936.  W. BARTKY  2,032,829

STAR FINDER

Filed Nov. 23, 1934

Inventor:
Walter Bartky,
By Cyrus Firth Lee, Christie, & Miles,
Attys

Patented Mar. 3, 1936

2,032,829

UNITED STATES PATENT OFFICE 2,032,829

STAR FINDER

Walter Bartky, Chicago, Ill., assignor to University of Chicago, Chicago, Ill., a corporation of Illinois Application November 23, 1934, Serial No. 754,530

6 Claims. (Cl. 35—44)

This invention relates to improvements in star finders and more especially to such a device adapted for use in locating constellations or groups of stars in the heavens.

Among the features of my invention is the provision of such a device adapted for use out of doors or in the dark. In general it includes a map showing a certain portion of the heavens with the constellations and stars depicted thereupon. This map is made small enough so it may be placed close to one eye of an observer without substantially obscuring the vision of the heavens of the other eye. Means are provided for rendering the stars on the map visible in the dark. Means are also provided for magnifying the map and the constellations depicted thereon to form a virtual image substantially the same size as the apparent size of the real constellations. This may be accomplished, for example, by means of an ordinary convex lens or magnifying glass. By this construction, the map and the constellations thereon may be viewed through the magnifying means through one eye and the real constellations simultaneously viewed with the other eye and the two visions fused. By this means the correct location in the heavens of any constellation shown on the map can be accurately determined and checked.

By making a relatively small map and looking at the same through magnifying means a relatively large sky area can be covered and fusion of vision or binocular vision still obtained. For example, I found, that a sky area subtending an angle of 30 degrees or more can very easily be depicted on the map. This map can be viewed by one eye through the magnifying means without substantially interfering with the vision of the corresponding actual sky area by the other eye.

Other features and advantages of my invention will appear more fully as I proceed with my specification.

It is to be understood that in using the term "constellation" or "constellations" I mean to include not only the well recognized constellations bearing names but also any group or groups of stars.

In that form of device embodying the features shown in the accompanying drawing—

Figure 1:
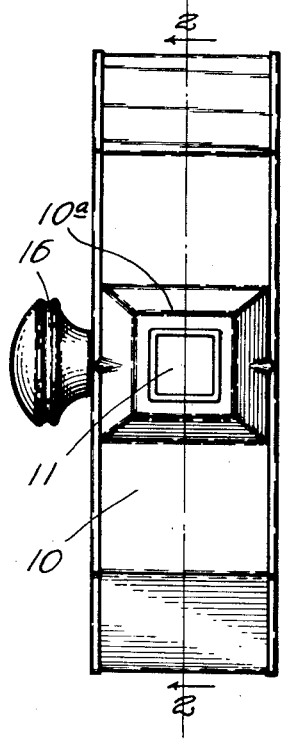
Figure 2:
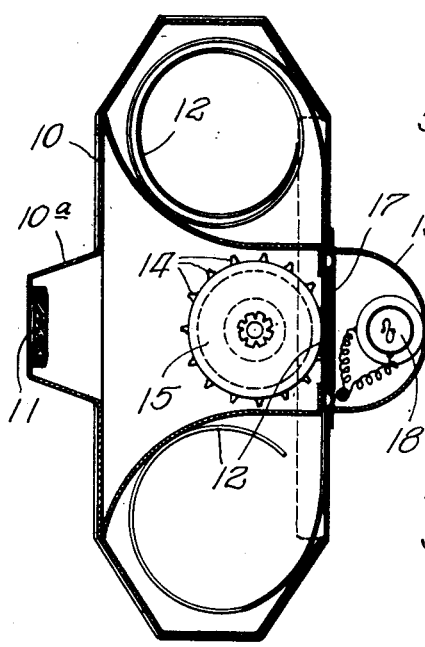
Figure 3:
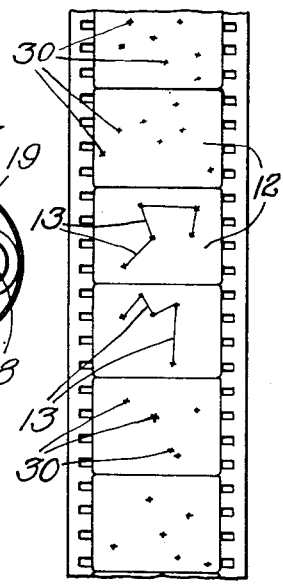

Fig. 1 is a view in front elevation; Fig. 2 is taken as indicated by line 2 of Fig. 1; Fig. 3 is a fragmentary view of a portion of a strip of star maps adapted for use in my device; and Fig. 4 is a diagrammatic view showing the operation of the device.

As shown in the drawing the device may include any suitable casing 10 with an eye-piece 10ª having a convex or magnifying lens 11 through which one of the star maps 12, 12 may be viewed. For convenience I have here shown a strip containing several star maps, said strip being provided with perforations 13 adapted to be engaged by the teeth 14 of the wheel 15 operated by a suitable end knob 16 so that any one of the maps 12 may be moved in front of the lens 11. In front of the map I prefer to provide a piece of ground glass 17 and in front of that a suitable illuminating means, for example, a flashlight lamp 18 inside of a casing 19. A suitable battery (not shown) may be provided to energize the lamp 18. This will illuminate the ground glass 17 and the star map 12 back of it. The map 12 may be made, for example, of opaque material and the constellations or groups of stars 30 thereon depicted by suitable holes through which the light from the lamp 18 diffused by the ground glass 17, is shown. If desired, the stars may be rendered luminous in the dark by painting the same on a map with luminous or phosphorescent paint.

Figure 4:
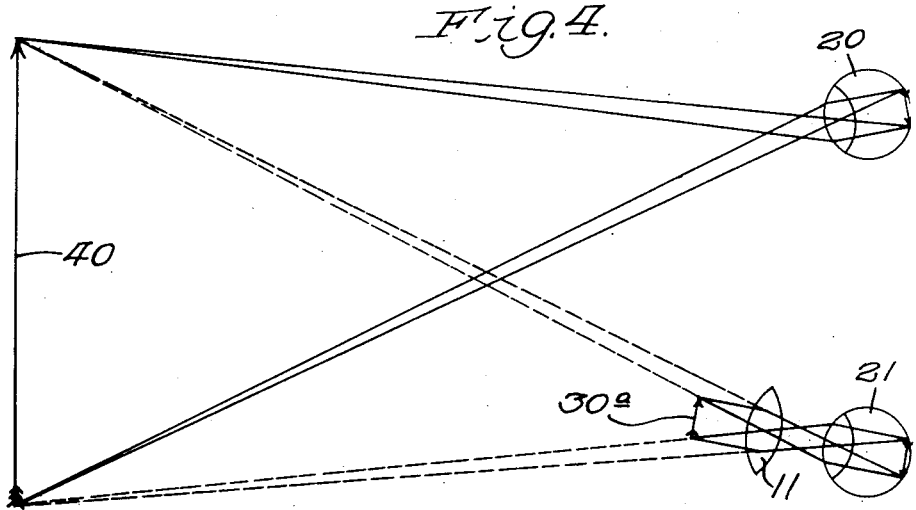

In Fig. 4 I have shown diagrammatically the operation of the device. As here shown the two eyes of an observer are indicated by 20 and 21. The arrow 40, the conventional representation of an object, is here used to represent a constellation or group of stars in the heavens. The arrow 30ª represents one of the constellations depicted on one of the maps 12. This map is viewed through the lens 11 by the eye 21. The map and constellation depicted thereon are of such size that when viewed through the lens 11 a virtual image will be formed exactly the same size as the apparent size of the real constellation. In other words, the arrow 40 also indicates the virtual image of the arrow 30ª when the latter is viewed through the lens 11 by the eye 21. It will be seen therefore that when the device is correctly pointed, the virtual image of the arrow 30ª seen by one eye may be superimposed upon the vision of the real constellation viewed by the other eye, and the two visions fused. If this fusion cannot be obtained, the observer has not correctly located in the heavens the constellations depicted on the map. When such fusion is obtained, however, it is an indication that the observer found the true location of the constellation shown. It is to be noted that the converging of the two eyes 20 and 21 shown in Fig. 4 is much greater than would be the case in the actual use of the device. This exaggeration of convergence is necessitated by the limits of the drawing.

As stated above, the map 12 may be made of opaque material, and the stars shown thereon by perforations. It is obvious, however, that the map can be made in various other ways. For example, the stars themselves can be shown by transparent or translucent spots or dots on opaque or partially opaque material. For example, the maps and outlines of the constellations can be drawn and then photographed on a film or plate to produce transparent or translucent photographic images. Also, the outlines of the constellations may be shown as desired, and one or more of the stars in different groups or constellations may be connected by lines. I have indicated this in two of the maps shown in Fig. 3. These lines, of course, would preferably be represented by transparent or translucent markings rather than by slits through the material itself.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A star-finder, including; a map showing a constellation of stars, said map having a width less than twice the distance between the eyes of an observer and adapted to be placed close to one eye of an observer without substantially obscuring the vision of the other eye; and magnifying means through which the map may be viewed when held before one eye, said means magnifying the constellation to form a virtual image substantially the same size as the apparent size of the real constellation, whereby the constellation on the map may be viewed through the magnifying means with one eye and the real constellation simultaneously viewed with the other eye and the two visions fused.

2. A device as claimed in claim 1, with means for rendering the stars on the map visible when the device is used in the dark.

3. A star-finder, including; a map showing a constellation of stars; a lens for magnifying the constellation to form a virtual image substantially the same size as the apparent size of the real constellation, the distance from the center of the lens to one side of the finder being less than the distance between the eyes of the observer, whereby the lens may be placed close to one eye of the observer without substantially obscuring the vision of the other eye of the observer to view the constellation on the map through the lens with one eye and the real constellation simultaneously viewed with the other eye and the two visions fused.

4. A star-finder, including; a star map depicting a sky area of at least 20 degrees and showing a constellation of stars thereon; and magnifying means through which the map may be viewed when held before one eye, said means magnifying the constellation to form a virtual image substantially the same size as the apparent size of the real constellation, whereby the constellation on the map may be viewed through the magnifying means with one eye and the real constellation simultaneously viewed with the other eye and the two visions fused.

5. A device as claimed in claim 4, with means for rendering the stars on the map visible when the device is used in the dark.

6. A star-finder, including; a star map depicting a sky area of at least 20 degrees and showing a constellation of stars thereon; and means for magnifying the constellation to form a virtual image substantially the same size as the apparent size of the real constellation, the distance from the center of the magnifying means to one side of the finder being less than the distance between the eyes of the observer, whereby the constellation on the map may be viewed through the magnifying means with one eye and the real constellation simultaneously viewed with the other eye and the two visions fused.

WALTER BARTKY.